United States Patent [19]

Schmauss et al.

[11] Patent Number: 4,472,757
[45] Date of Patent: Sep. 18, 1984

[54] ELECTRIC CAPACITOR WITH LIQUID COOLING

[75] Inventors: Herman Schmauss, Selb; Alfred Zeitner, Hohenberg; Helmut Hoffmann, Thiersheim; Werner Wollenschläger, Marktredwitz; Heinz Schlegel, Selb, all of Fed. Rep. of Germany

[73] Assignee: Draloric Electronic GmbH, Fed. Rep. of Germany

[21] Appl. No.: 491,886

[22] Filed: May 5, 1983

[51] Int. Cl.³ .............................................. H01G 1/08
[52] U.S. Cl. .................................................. 361/274
[58] Field of Search ........................................ 361/274

[56] References Cited

U.S. PATENT DOCUMENTS

| | | | |
|---|---|---|---|
| 761,090 | 5/1904 | Moscicki | 361/274 UX |
| 1,934,475 | 11/1933 | Bailey | 361/274 |
| 2,129,008 | 9/1938 | Kater | 361/274 |
| 2,326,151 | 8/1943 | Marbury | 361/274 |
| 2,794,063 | 5/1957 | Nicholas | 361/274 |
| 3,259,818 | 7/1966 | Garstang et al. | 361/301 X |
| 3,571,676 | 3/1971 | Hottinger | 361/329 |
| 4,075,680 | 2/1978 | Shipp | 361/285 |
| 4,271,454 | 6/1981 | Knobl et al. | 361/274 |
| 4,351,746 | 9/1982 | Parish et al. | 361/311 X |

FOREIGN PATENT DOCUMENTS

| | | |
|---|---|---|
| 1726891 | 7/1953 | Fed. Rep. of Germany . |
| 1052570 | 3/1959 | Fed. Rep. of Germany . |
| 1283394 | 11/1968 | Fed. Rep. of Germany . |
| 2401802 | 7/1974 | Fed. Rep. of Germany . |

*Primary Examiner*—Donald A. Griffin

[57] ABSTRACT

An electric capacitor particularly for use as a high frequency power capacitor, and provided with liquid cooling, the capacitor having separated metal layers as its plates and the metal layers being separated by a densely sintered ceramic dielectric body, one embodiment of which is generally pot-shaped. Heat generated in the capacitor is dissipated by cooling liquid which is directed by a jacket surrounding that one metal layer to pass over the metal layer and dissipate the heat. The metal layer is comprised of a silver frit. To avoid the metal layer being eroded by the cooling liquid, a layer of glaze, which is resistant to the cooling liquid and whose coefficient of expansion is similar to that of the dielectric body covers over the metal layer in contact with the cooling liquid.

9 Claims, 1 Drawing Figure

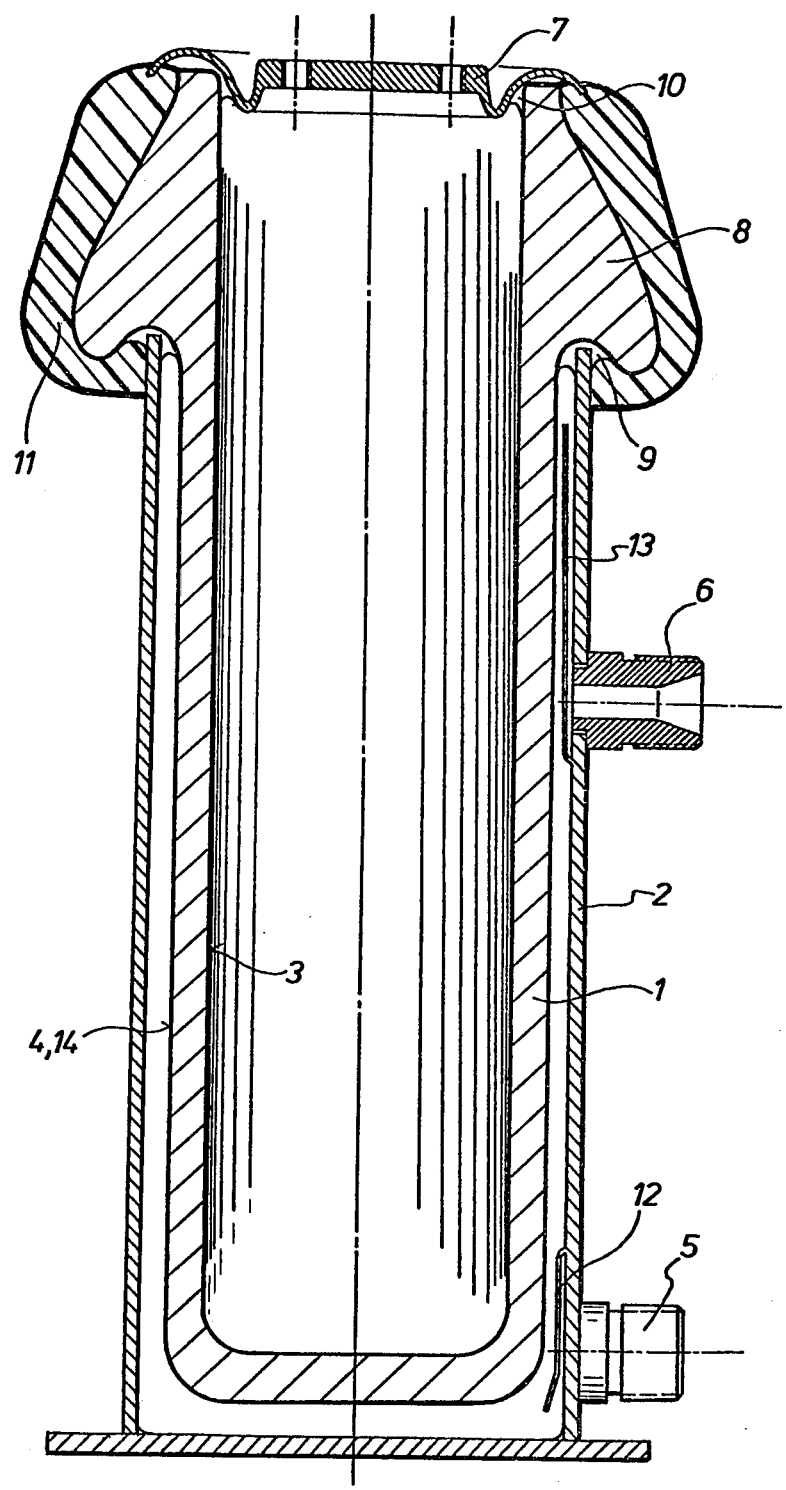

ELECTRIC CAPACITOR WITH LIQUID COOLING

BACKGROUND OF THE INVENTION

The present invention relates to an electric capacitor which is provided with liquid cooling. Such capacitors are particularly used in high-frequency industrial generators. They include two capacitor plates which are separated from each other by a dielectric, and particularly by a densely sintered ceramic dielectric body. At least one of the metal layers of one of the capacitor plates is cooled by a cooling liquid, such as water, and the water is contained in contact with the metal plate by a protective jacket.

One such liquid-cooled ceramic capacitor is known from German Published Application DE-OS No. 24 01 802. It includes a protective jacket comprised of a metal cylinder, which is arranged over the capacitor metal plate to be cooled. The jacket avoids acceleration of the migration of silver through the ceramic dielectric and/or the corrosion and erosion of the silver electrodes by the cooling water. The metal cylinder may be comprised, for instance, of brass or copper. The cylinder is soldered over its entire surface to the plate to be cooled by means of a layer having a low-melting alloy of high thermal conductivity and having the desired compatability with the ceramic dielectric with respect to their respective coefficients of expansion. However, mechanical stresses still may occur upon variations in temperatures. Furthermore, either the inside diameter of the ceramic dielectric or the outside diameter of the metal cylinder, which are at the opposed surfaces of the dielectric and the cylinder, must be exactly adapted to each other by grinding. Otherwise, the space presented between the metal cylinder and the tubular dielectric will only be imperfectly filled by the low-melting point solder alloy, which shrinks upon solidification.

For this reason, German Provisional Patent DE-AS No. 12 83 394 shows an electric capacitor with liquid cooling, with a slot-shaped space between the metal cylinder for the cooling liquid and that surface of the ceramic dielectric which is provided with a metal layer of a plate. That space is filled with a material of good electrical and heat conductivity which is in powder form, for instance, powdered silver or silver-coated copper powder.

Both above-described embodiments of electrical liquid-cooled capacitors have a metallic protective jacket which is electrically connected either through a layer of solder metal or by a metal powder to the metal layer of the capacitor plate which is to be cooled. As a result, the cooling liquid is relatively far away from the place where the heat to be dissipated is produced.

German Utility Model DE-GM No. 17 26 891 shows a ceramic capacitor with liquid cooling, in which at least that part of the ceramic dielectric which is covered with electrodes forms or has a cavity to receive the cooling liquid. The publication also describes the self-evident requirement that the metal layers of the plates not be attacked by the cooling liquid. This requirement is satisfied in the embodiment of a capacitor in this DE-GM. The expense of complying with this requirement, however, is very great.

If distilled or demineralized water, whose specific conductance is within the range below 70 $\mu$S.cm$^{-1}$, is used as the cooling liquid, then it is possible that the metal layer of the outer cooled plate, starting at microscopically small defect points and as a result of the large mechanical forces induced thereby, will be removed in circular areas. This could occur, for instance, in the case of water-cooled pot-shaped capacitors like those known from the catalogue, "Keramische Leistungskondensatoren" ("Ceramic Power Capacitors"), 3A5.78, or from German Provisional Patent DE-AS 10 52 570 of the assignee hereof. The silver particles of the metal layer of the plate are bonded in a frit. Removal of these particles leads to a decrease in the capacitance of the capacitor, until it fails completely as a result of its dropping below the permissible limit of the tolerance of the capacitance.

SUMMARY OF THE INVENTION AND DESCRIPTION OF THE DRAWING

The object of the present invention is to improve an electric capacitor of the aforementioned type such that the metal layer of the or each capacitor plate, which is in contact with the cooling liquid, is simply protected against erosion and such that there is optimum heat transfer from the dielectric to the cooling liquid.

According to the invention, the electric capacitor comprises two plates having respective metal layers which are separated from each other by a dielectric body which is a densely sintered ceramic. The metal layer of at least one of the plates, and even of both plates, is cooled by a liquid, which may, for instance, be water. The metal layer of the or of each plate that is in contact with the cooling liquid is directly covered over by a layer of a protective glaze which is resistant to the cooling liquid and does not erode in its presence. The layer of glaze over the metal layer has a coefficient of expansion which is adapted to the coefficient of expansion of the ceramic dielectric body, whereby the glaze will not separate from the metal layer over time due to the heating and cooling of the dielectric body.

A protective jacket is disposed opposite and slightly spaced away from the glazed metal layer for defining a narrow width slot for containing the cooling liquid which contacts the metal layer. The jacket has an inlet and an outlet spaced away from the inlet for a flow of the cooling liquid through the jacket, thereby to dissipate the heat generated in the capacitor through the metal layer contacted by the cooling liquid.

The metal layer carrying the glaze or both metal layers, whether or not one or both layers carries the glaze, is comprised of a frit of silver. The layer of glaze would correspondingly be comprised of the same frit material, which would help assure the same coefficient of expansion for the glaze and the metal layer.

The densely sintered ceramic dielectric body in the below-described preferred embodiment generally has the shape of an open top, cylindrical pot, with one metal layer inside the pot-shaped body and the other metal layer extending along the outside of the pot-shaped body. In that case, the two plates are separated from each other by the pot-shaped wall of the dielectric body. Toward the open end of the body, the plates are separated from each other by a corona-shield, bead shaped annular rim around the exterior of the top of the pot. The invention may be adapted for use with a dielectric body that has other shapes, such as a disc, or a tube, etc.

The invention has a number of advantages. Any desired cooling liquid can be used without the silver deposit glaze which is in contact with the cooling liquid being removed. The heat conductance through the relatively thin layer of glaze is optimum. The application of the layer of glaze, which protects the metal layer of the plate which is to be cooled, can be accomplished quite simply.

The drawing FIGURE shows one embodiment of the invention in a power capacitor in cross section.

DESCRIPTION OF THE PREFERRED EMBODIMENT

The illustrated power capacitor has a densely sintered, hollow ceramic dielectric body 1 which is developed in pot shape with a closed bottom and an open top. The body 1 separates the metal layer 3 of the inner plate of silver coated on the interior surface of the dielectric body from the metal layer 4 of the outer plate coated on the outside surface of the dielectric body. At least the metal layer 4, which is in contact with cooling liquid, and perhaps the other metal layer as well, is comprised of a silver frit. The metal layers contacted by cooling liquid, such as water, are liable to become eroded by the cooling liquid.

There is an annular corona-shield bead rim 8 at the front or open end of the dielectric body 1. The inner plate of silver extends around the front surface of the dielectric 1 up to the place of commencement of the corona-shield, anti-spray bead rim 8 at the front of the capacitor. A connecting fitting 7 having an arched annular edge region is electrically conductively connected to the inner plate by a layer of solder tin 10 which extends around the front surface of the dielectric body.

The dielectric body 1 hangs within a cylindrically shaped sheet-metal jacket 2 whose open or front surface is located at the annular fillet at the rear of the anti-spray bead rim 8. The cylindrical sheet-metal jacket 2 has an inside diameter which is greater than the outside diameter of the dielectric body 1 so as to form a narrow width annular slot. Cooling water can be fed through an inlet connection 5 into the slot, and the water can be discharged from the slot through an outlet connection 6. The water circulates through the slot for removing the dissipated heat from the capacitor. The outer surface of the pot-shaped dielectric body 1 is covered, up into the fillet of the rim 8, by the silver outer metal layer 4, which forms the outer plate of the capacitor. The cylindrical sheet-metal jacket 2 is fastened by a circumferential layer of solder tin 9 in the fillet in the rim 8 of the dielectric body 1 in a manner tightly closing off the narrow slot for the circulation of the cooling water.

In order to direct the flow of cooling water in the region of the inlet connection 5 and of the outlet connection 6, baffle plates 12 and 13 are provided inside the cooling sheet-metal jacket 2.

There is a layer of glaze 14 in a layer thickness of about 40 μm and having a coefficient of expansion adapted to that coefficient of the dielectric body 1, which completely covers the silver layer 4 up to the layer of solder tin 9. The glaze is also preferably comprised of a silver frit of similar conductive and expansive characteristics as the metal layer beneath it. On the one hand, this prevents the cooling water from removing any of the silver layer 4. On the other hand, the water is in good thermal contact with the metal layer 4 of the outer plate to be cooled so that the dissipated heat produced in the capacitor can be optimally led away.

The invention is not limited to pot capacitors of the type shown. It may also be applied to disc-shaped capacitors such as those described, for instance, in German Utility Model DE-GM No. 78 07 683 of the assignee hereof or to tubular capacitors with inner and/or outer cooling.

Although the present invention has been described in connection with a preferred embodiment thereof, many variations and modifications will now become apparent to those skilled in the art. It is preferred, therefore, that the present invention be limited not by the specific disclosure herein, but only by the appended claims.

What is claimed is:

1. An electric capacitor with liquid cooling, comprising a pair of spaced apart plates having metal layers, a densely sintered ceramic dielectric body, the dielectric body being disposed between the metal layers of the plates and the plates being carried on opposite surfaces of the dielectric body and being separated thereby;
   means for delivering cooling liquid to at least one of the metal layers for dissipating heat generated in the capacitor and transmitted through the one metal layer;
   a protective layer of glaze applied to the metal layer being exposed to the cooling liquid for protecting the glazed metal layer against erosion from the liquid, and it is the glaze which is exposed to the cooling liquid; the ceramic dielectric body having a respective coefficient of expansion and the glaze layer also having a respective coefficient of expansion which is similar to that of the dielectric body.

2. The electric capacitor of claim 1, wherein the layer of glaze is comprised of a metal frit, and the metal layer covered by the glaze also comprises a metal frit which is similar to the frit material of the glaze.

3. The electric capacitor of claim 1, wherein the dielectric body has a pot shape, with a closed rear end and an open front end; one of the metal layers being applied on the interior of the pot-shaped body and the other of the metal layers being applied on the exterior of the pot-shaped body.

4. The electric capacitor of claim 3, further comprising a corona-shield annular bead rim around the front end of the pot-shaped dielectric body for separating the metal layer on the inside of the pot-shaped body from the metal layer on the outside.

5. The electric capacitor of claim 3, wherein the means for delivering cooling liquid to the one metal layer comprises a jacket surrounding the one metal layer and spaced away therefrom for defining an annular slot between the layer of glaze and the jacket for containing the cooling liquid.

6. The electric capacitor of claim 5, further comprising an inlet for cooling liquid into the jacket and an outlet for cooling liquid from the jacket, the inlet and outlet being spaced apart, for permitting circulation of cooling liquid through the jacket.

7. The electric capacitor of claim 6, wherein the jacket is sealed closed against leakage around the one metal layer.

8. The electric capacitor of claim 1, wherein the means for delivering cooling liquid to the one metal layer comprises a jacket surrounding the one metal layer and spaced away therefrom for defining an annular slot between the layer of glaze and the jacket for containing the cooling liquid.

9. The electric capacitor of claim 8, wherein the jacket is sealed closed against leakage only around the one metal layer.

* * * * *